United States Patent Office 3,782,981
Patented Jan. 1, 1974

3,782,981
ALPHA-WOLLASTONITE PINS AND SETTERS
David Rostoker, Corning, N.Y., assignor to Corning
Glass Works, Corning, N.Y.
Filed May 1, 1972, Ser. No. 248,862
Int. Cl. C04b 35/22, 35/20
U.S. Cl. 106—73.5                                  1 Claim

ABSTRACT OF THE DISCLOSURE

This invention relates to the glaze firing of ceramic and glass-ceramic articles wherein such articles are supported on setter pins within the firing chamber. More particularly, this invention is concerned with the production of such pins with accompanying setters from alpha-wollastonite.

Figure 1:
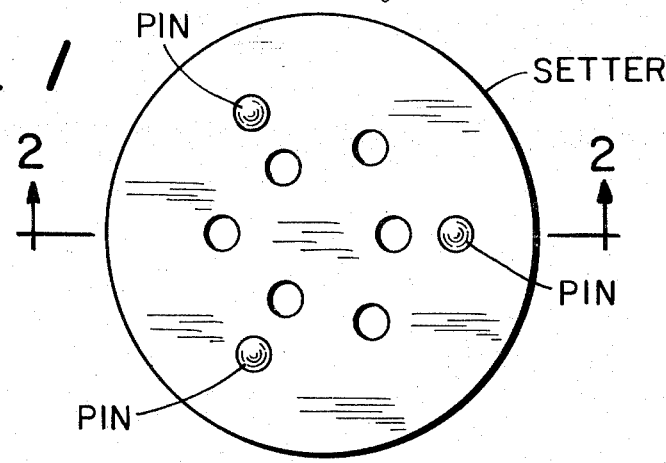

In the firing of ceramic and glass-ceramic articles having a glaze composition applied thereto, it is conventional to utilize supports therefore composed of a refractory material. The ideal support material will demonstrate the following four characteristics: (1) it will be capable of withstanding the high temperatures required for glazing; (2) it will exhibit good resistance to thermal shock so that degradation through cracking and spalling is not encountered; (3) it will not react chemically with the glaze or the body of the article being fired; and (4) it will not be wetted by the glaze such that glaze-to-glaze contact with consequent sticking is avoided.

In the past these supports have ranged in composition from metals such as stainless steel, where relatively low firing temperatures were employed, to platinum and over a wide variety of refractory ceramic materials which were capable of withstanding the high temperatures required in any particular glazing operation. In general, the function of a glaze has been primarily decorative. During recent years, however, manufacturers of ceramic and glass-ceramic articles have been striving to make use of the strengthening effect that can be enjoyed where a glaze having a lower coefficient of thermal expansion than the body material is applied to the article. Thus, upon cooling the composite article after the glaze firing step, the glaze forms a surface compression layer on the article which acts to significantly enhance the mechanical strength of the article. A second feature of these lower expansion glazes is their higher fusion temperatures. This factor has led to the need for support materials demonstrating greater refractoriness and also has tended to result in increased reactivity between the support materials and the glaze and/or the body of the article being fired.

Glazes which have been found to be particularly effective both from a decorative point of view as well as having such practical features as low coefficient of thermal expansion, ease of forming, and good stability are reported in U.S. Pat. No. 3,384,508. As is explained therein, the compositions of those glazes consist essentially, by weight, of about 1.5–16% $Na_2O$, 3–10% $Al_2O_3$, 4–19% $B_2O_3$, 40–70% $SiO_2$, 0–8% $K_2O$, 0–12% CaO, 0–40% PbO, 0–5% $ZrO_2$, 0–5% CdO, 0–8.5% $CaF_2$, 0–2% ZnO, and 0–9% MgO, the total of the alkali metal oxides not exceeding 16%. In general, the coefficients of thermal expansion of those glazes over the range 0°–300° C. will vary between about 60–100×$10^{-7}$/° C. with those ranging between 60–80×$10^{-7}$/° C. being the most useful where a high compression surface layer is desired.

Because of the high firing temperatures required and the great reactivity of the glaze, extremely refractory materials which were not wet by the glaze, such as platinum metal, have been conventionally employed as contacting support materials. Hence, for example, in the glaze firing of such articles as dinnerware cups where the cup is conventionally placed upon a three-point contact, the three points have been formed from platinum metal. Whereas the platinum is not chemically attacked by the glaze and is not affected by the high firing temperatures required, the cost of platinum is very great and there is a loss of the platinum pins in the firing operation and in the recycling of the pins when they become damaged. Hence, a less expensive substitute therefore has been sought.

Therefore, the primary objective of this invention is to produce relatively inexpensive support materials useful in the high temperature glaze firing of ceramic and glass-ceramic articles which are highly refractory, which exhibit good thermal shock resistance, which are essentially non-wetted by the glaze, and which are substantially non-reactive with the glaze and/or the fired article.

Figure 2:
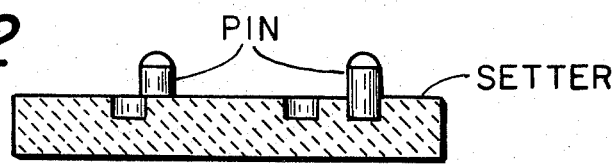
Figure 3:
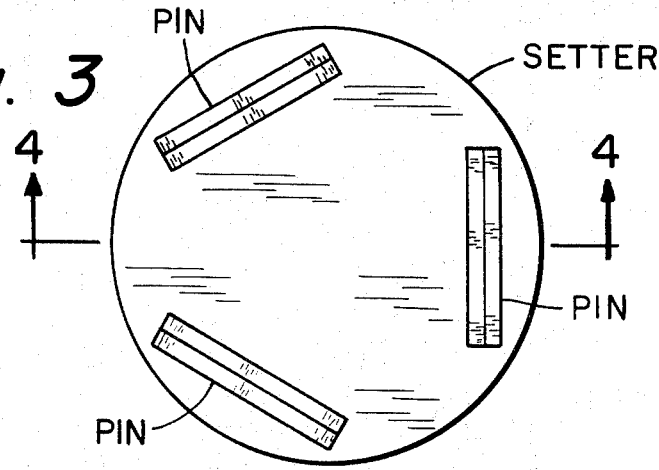
Figure 4:
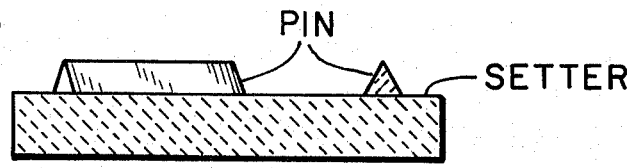

Other objectives will become apparent from a study of the following description of the invention and an examination of the appended drawing wherein:

FIGS. 1 and 2 illustrate a preferred design of a setter and acompanying pins utilized in supporting dinnerware for glaze firing; and FIGS. 3 and 4 represents another design for pins which can be utilized desirably with large dinnerware items such as serving plates.

I have discovered that the above objectives can be secured where the support materials are composed essentially of alpha-wollastonite. The preferred glazes exhibit coefficients of thermal expansion between about 60–100×$10^{-7}$/° C. and consist essentially, by weight, of about 1.5–16% $Na_2O$, 3–10% $Al_2O_3$, 4–19% $B_2O_3$, 40–70% $SiO_2$, 0–8% $K_2O$, 0–12% CaO, 0–40% PbO, 0–5% $ZrO_2$, 0–5% CdO, 0–8.5% $CaF_2$, 0–2% ZnO, and 0–9% MgO, the total of the alkali metal oxides not exceeding 16%.

Wollastonite is a naturally occurring, fibrous calcium metasilicate having the theoretical composition, by weight, of 48.3% CaO and 51.7% $SiO_2$. There are two polymorphs of calcium metasilicate: a low temperature form termed beta-wollastonite and a high temperature form denominated alpha-wollastonite. The temperature at which beta-wollastonite will undergo a phase change, or phase inversion, varies somewhat depending upon the impurities present in the calcium metasilicate and the time alloted for the inversion to take place. Reactions in the solid state take time to proceed to completion and the inversion of beta-wollastonite to the alpha form has been observed to be quite sluggish below about 1150° C. Therefore, a temperature of about 1175° C. has been considered a practical minimum to carry out the phase transformation. It should be noted that after the inversion of beta-wollastonite to the alpha form has been accomplished through heat treatment thereof at temperatures of 1175° C. and higher, that high temperature phase will not revert back into the beta form upon cooling below 1175° C.

The inversion of beta-wollastonite to alpha-wollastonite has a very significant effect upon the coefficient of thermal expansion exhibited. Thus, over the temperature range 25°–800° C., the coefficient of thermal expansion of beta-wollastonite is about 65×$10^{-7}$/° C. whereas that of the alpha form is about 118×$10^{-7}$/° C. The melting point of wollastonite has been measured at about 1540° C.

As can be observed in the appended drawing, the conventional support utilized in the high temperature glaze firing of ceramic and glass-ceramic articles consists of two parts: a relatively large setter or holder and several smaller pins. The article to be fired rests upon these pins resulting in essentially point contact between the support material and the glazed article. Inasmuch as the setter has a rather large bulk, it is of great importance that the material of which it is composed exhibits good resistance to thermal shock. The dimensions of the pins are relatively small such that resistance to thermal shock does not assume as much importance. Nevertheless, the material comprising the pins must demonstrate good mechanical strength to resist impacts received when the articles to be fired are placed upon and subsequently removed from them.

I have found that press-formed bodies of alpha-wollastonite display thermal, chemical, and mechanical properties eminently desirable for setter pins for use with high temperature, low expansion glazes. Thus, although alpha-wollastonite has a relatively high coefficient of thermal expansion, the inherent microstructure and/or the porosity of the material coupled, of course, with the small size of the pins appears to have substantially inhibited breakage from thermal shock. Alpha-wollastonite is essentially non-wetted by the low-expansion glazes referred to above and is not chemically reactive therewith. Finally, the press-formed bodies, after sintering, will demonstrate modulus of rupture values between about 3000–5000 p.s.i. which have proven to be very ample for service as setter pins.

In general, press-formed bodies obtained, for example, by extrusion, injection molding, isostatic pressing, and hydraulic pressing perform better than products formed through other methods such as slip casting or jiggering. A comparison of the bodies manifested a quite uniform porosity (about 25–35% and uniform pore size (about 1–3 microns in diameter) with the press-formed bodies whereas the uniformity of these characteristics was not as durable where other forming practices were used. Therefore, pins and setters made by a press-forming operation are definitely to be preferred. Nevertheless, the actual process steps for producing the articles of this invention merely utilize conventional forming techniques; the following is a description of one method that can be employed.

A batch was compounded consisting of naturally-occurring beta-wollastonite having a grain size wherein about 97% passed a 200 mesh screen (74 microns) to which about 30–40% water and 5–10% of an organic binder such as biphenyl or paradichlorobenzene was admixed. The resultant slurry was spray dried to form granules as nearly spherical as possible with the granules passing a 48 mesh screen (297 microns) and resting on a 150 mesh screen (105 microns). Granules of that configuration and dimensions yield a free flowing body in the press. Thereafter, the granular material was passed into an injection mold and pressed into cylindrically-shaped bodies with one flat and one rounded end, such as the pins illustrated in FIG. 2. These bodies were then fired to sinter the grains together and to cause the inversion of beta-wollastonite to the alpha form in accordance with the schedule set out below:

Heated slowly (no more than about 5° C./minute) to 200°–400° C. and held thereat for about ½–2 hours to remove the water and organic binder.

Heated at a rate not exceeding about 10° C./minute to 1200°–1400° C. and held thereat for about 1–4 hours to cause sintering and phase inversion.

Heat cut off and furnace allowed to cool to room temperature with pins retained therein.

As was noted above, the minimum practical temperature for transforming the naturally-occurring beta-wollastonite to the alpha phase is about 1175° C. and the melting temperature of wollastonite is about 1540° C. Since melting of the material is undesirable, the firing should be conducted below that temperature. Therefore, the inversion of beta-wollastonite to the alpha form ought to be carried out at a temperature greater than 1175° C. but less than 1540° C., a temperature in the higher extreme of this range being preferred inasmuch as the phase inversion will take place more rapidly.

The fired pins readily withstand the glazing temperatures generally employed (about 850°–1300° C.) and are not degraded by the thermal shock encountered in service. The material is not truly wetted by the glazes and the inherent porosity and the size of the pores imparts exceptional utility to these pins. Thus, during the glazing operation, the fluid glaze will be absorbed in the pores such that the surface contacting the fired articles will be essentially glaze-free. This phenomenon obviates sticking which occurs with glaze-to-glaze contact. In normal practice, these pins have frequently been utilized in 25 separate glaze-firing operations before glaze buildup thereon has become so great as to cause a sticking problem and demanding replacement.

Pins were formed from the same wollastonite batch materials but were fired at a temperature approximately 1150° C. for about 30 minutes. That temperature resulted in the sintering of the pins but the original beta-wollastonite was not transferred to the alpha phase. The final product was weak, i.e., a modulus of rupture of 1500 p.s.i. and less, and the pore size was less than one micron. These pins suffered mechanical breakage in service and, presumably due to the small pore size, did not readily absorb the fluid glaze resulting in early glaze-to-glaze contact with consequent sticking.

Setters formed in the manner described above were subject to breakage resulting from thermal shock. It is assumed that this was caused by the relatively large bulk of the bodies coupled with the high coefficient of thermal expansion of the material. To offset this problem, minor amounts, e.g., about 5–20% by weight, of −200 mesh calcined talc were added to the initial batch and the setters then formed in accordance with the general method outlined above for the pins. Obviously, the molds would be altered to accommodate the larger bodies, e.g., discs about 2½" in diameter x ¼" thick. The inclusion of the talc decreases the porosity of the body, thereby rendering it less desirable for pins, but it does strengthen the body and causes an appreciable lowering of coefficient of expansion to about $80 \times 10^{-7}/°$ C. This latter factor is of vital importance in avoiding thermal breakage of the setters.

FIGS. 1 and 2 illustrate a typical pin and setter unit utilized in carrying small dinnerware items such as cups and saucers through a glazing kiln. Conventionally, the pins are placed in holes to provide a three-point contact. The holes are spaced to permit flexibility in support depending upon the size of the article being glazed. An integral composite of setter and pins can be fabricated wherein the pins are cemented into the setter. However, the subsequent failure of any part thereof requires the entire unit to be discarded. Hence, experience has shown it to be more practical to utilize the setter and pins as separate units. In general, the setters are rarely lost or broken whereas the pins will require replacement due to glaze buildup.

FIGS. 3 and 4 represent a useful variation where large articles are to be glazed. The "pins" are actually three-sided prisms which merely rest on the setter. The three sides allow the pins to be turned to expose a new edge surface when glaze buildup is observed on one edge.

The practical utility of this invention is clearly demonstrated in the following example.

Dinnerware cups made from a glass-ceramic of the type described in U.S. Pat. No. 3,201,266, exhibiting a coefficient of thermal expansion of about $97 \times 10^{-7}/°C$., and having the approximate composition, in weight percent as calculated on the oxide basis, of

|  | Percent |
|---|---|
| $SiO_2$ | 43.1 |
| $Al_2O_3$ | 30.1 |
| $Na_2O$ | 13.9 |
| $BaO$ | 5.6 |
| $TiO_2$ | 6.5 |
| $As_2O_3$ | 0.8 | were coated with a glaze frit of the type and in the manner reported in U.S. Pat. No. 3,384,508, exhibiting a coefficient of thermal expansion of about $62 \times 10^{-7}/°C.$, and having the approximate composition, in weight percent as calculated on the oxide basis, of

| | Percent |
|---|---|
| $SiO_2$ | 48.0 |
| $Al_2O_3$ | 7.0 |
| $Na_2O$ | 3.0 |
| $K_2O$ | 1.0 |
| PbO | 21.0 |
| CaO | 8.0 |
| $B_2O_3$ | 10.0 |
| CdO | 0.3 |
| $ZrO_2$ | 0.7 |
| $CaF_2$ | 1.0 |

The coated cups were then placed upon the tips of the three pins which had been inserted into holes in the supporting setter in the proper position and this unit transferred to a tunnel kiln for firing. A top firing temperature of about 1100° C. was reached within the kiln. The pins exhibited no evidence of failure and the tips thereof appeared free from glaze buildup. The setters, likewise, demonstrated no signs of attack. The points of contact between the cup and the pins were scarcely perceptible in the cup surface. The modulus of rupture of the glazed article was about 35,000 p.s.i. compared to about 12,000 p.s.i. for the unglazed ware.

Because of the critical combination of non-wettability, porosity, pore size, expansion, thermal stability, and chemical inertness, it is much preferred that the pins consist essentially solely of alpha-wollastonite. However, where large pins are employed, e.g., of the prismatic type illustrated in FIGS. 3 and 4, minor amounts of calcined talc may be added to improve the thermal shock resistance of the body. Such additions imply a compromise between the need for thermal shock resistance and the best porosity and pore size distribution for glaze contact.

Finally, whereas the invention has been described with respect to the glazing of ceramic and glass-ceramic articles, it will be recognized that the pins and setters disclosed can be used for holding simple green bodies for firing. Hence, for example, glass articles which are to be crystallized in situ to glass-ceramic articles or green ceramic bodies which are to be sintered can be supported thereon for the firing step.

I claim:
1. In a method for firing ceramic and glass-ceramic articles wherein said articles are glazed with high temperature, low expansion glazes and are supported upon pins held by setters placed within a firing chamber, the improvement which comprises supporting said articles upon pins consisting essentially of alpha-wollastonite and setters consisting essentially of alpha-wollastonite and 5–25% by weight calcined talc, and wherein said pins are press-formed and sintered.

References Cited
UNITED STATES PATENTS

| | | | |
|---|---|---|---|
| 3,520,705 | 7/1970 | Shido et al. | 106—53 X |
| 3,549,393 | 12/1970 | Elarde | 106—73.4 |
| 3,641,229 | 2/1972 | Lawrence et al. | 106—73.5 |
| 2,621,131 | 12/1952 | Lathe | 106—61 |

HELEN M. McCARTHY, Primary Examiner

U.S. Cl. X.R.

65—374; 106—58, 61, 63